United States Patent [19]
Guenter

[11] Patent Number: 5,625,182
[45] Date of Patent: Apr. 29, 1997

[54] LIGHT SENSOR WITH POSITION COMPENSATION ACCOMPLISHED BY AREA DISTRIBUTION

[75] Inventor: James K. Guenter, Garland, Tex.

[73] Assignee: Honeywell Inc., Minneapolis, Minn.

[21] Appl. No.: 576,143

[22] Filed: Dec. 21, 1995

[51] Int. Cl.$^6$ ..................................................... G01B 11/00
[52] U.S. Cl. .................. 250/229; 250/206.1; 250/214 R; 250/237 R
[58] Field of Search .............................. 250/206.1, 206.2, 250/208.2, 208.6, 214.1, 214 R, 214 PR, 214 SW, 221, 222.1, 229, 237 R, 231.1; 257/431, 432, 434, 435; 327/514; 356/373, 375

[56] References Cited

U.S. PATENT DOCUMENTS

| | | | |
|---|---|---|---|
| 5,079,432 | 1/1992 | Miller | 250/229 |
| 5,194,919 | 3/1993 | Katayama | 250/229 |
| 5,371,359 | 12/1994 | Hagiuda et al. | 250/229 |
| 5,483,060 | 1/1996 | Sugiura et al. | 250/237 R |

*Primary Examiner*—Edward P. Westin
*Assistant Examiner*—John R. Lee
*Attorney, Agent, or Firm*—William D. Lanyi

[57] ABSTRACT

A light sensor comprises two light sensitive areas that are shaped to physically compensate for the decrease in light intensity resulting from movement of a movable object in which an aperture is formed. Movement of the aperture causes the light passing through the aperture to have a decreased circumscribed angle that results in a decrease of light intensity impinging on a light sensitive component. In order to avoid the nonlinearity that can result from the decrease in light intensity as a function of the physical position of a movable object being sensed, the light sensitive areas are tapered by selecting the width of the light sensitive area as a function of the distance from a reference line. The light sensitive areas are tapered by arranging the edges of the areas so that the minimum width of each of two light sensitive areas are abutting each other at the reference line and the edges of both light sensitive areas are tapered outward away from each other at positions farther from the reference line.

20 Claims, 9 Drawing Sheets

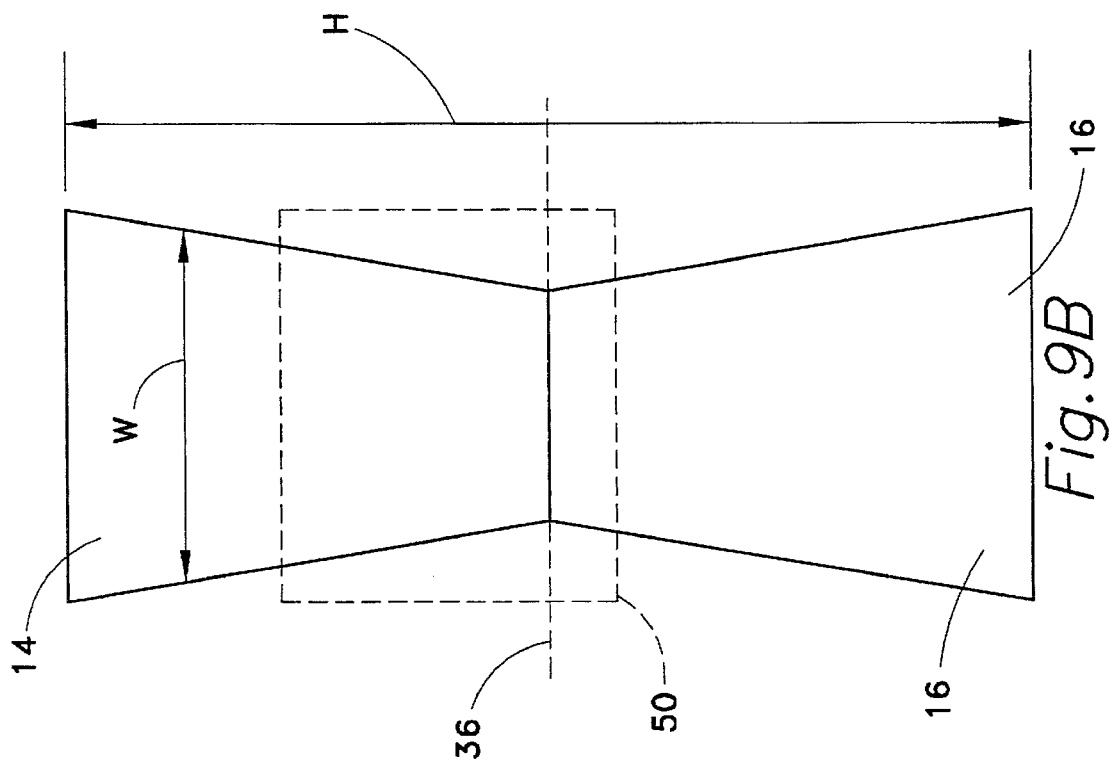
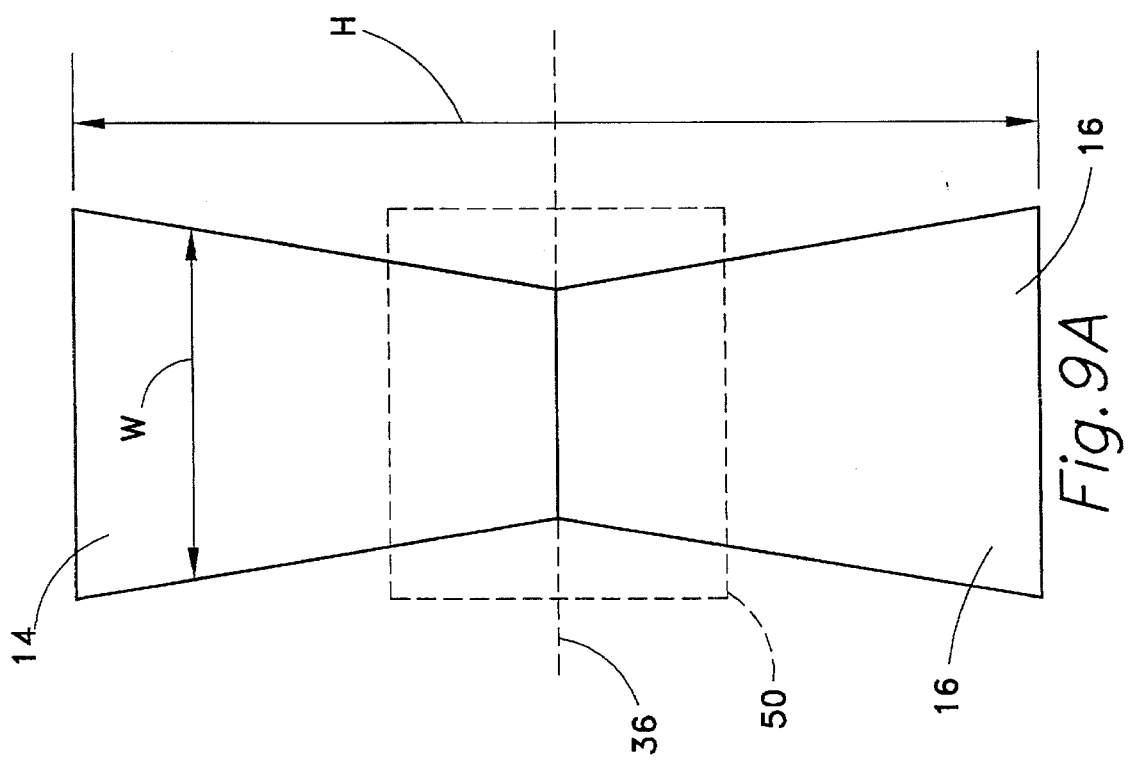

LIGHT SENSOR WITH POSITION COMPENSATION ACCOMPLISHED BY AREA DISTRIBUTION

BACKGROUND OF THE INVENTION

1. Field of the Invention

The present invention is generally related to a photoelectric sensor that senses the light passing through a movable aperture and, more particularly, to a light sensor which has a light sensitive area that is shaped to provide a generally linear output even though the intensity of light impinging on the light sensor can vary as a function of the position of a movable object in which an aperture is formed.

2. Description of the Prior Art

Many different types of light sensors are known to those skilled in the art. One type of known photoelectric sensor incorporates a light source, a pair of light sensors and a movable object that comprises an aperture formed therethrough. The plane of the movable object is generally parallel to the plane in which the two light sensors are disposed. The total power of the light impinging on each of the light sensors is restricted to the light which passes through the aperture formed in the movable object. A light sensor of this type can be incorporated in a switch of which the plunger is attached to the movable object. The light impinging on the two light sensors can be compared to determine the precise position of the movable object.

A problem that exists in light sensors such as that described immediately above is that the position of the movable object and its aperture changes the intensity of light passing through the aperture and impinging on the light sensors. If the output signal of one light sensor is subtracted from the output signal of the other light sensor, a decrease in the light intensity passing through the aperture can adversely affect the linearity and accuracy of the device. Since, in normal operation, movement of the movable object causes the lighted portion of one light sensor to be larger than the lighted portion of the other light sensor, and the light intensity impinging on the light sensors is decreased, the algebraic difference between the two output signals can be nonlinear. It would therefore be significantly beneficial if a light sensor of this general type could be improved in a way which increases the linearity of an output signal that is formed by subtracting the output signal of one light sensor from the output signal of the other light sensor. Although devices such as these described above can compare the two light sensor signals from each other, it should be clearly understood that other means of signal comparison are also possible. For example, a ratio of the two light sensor signals can be used to compare their relative magnitudes.

SUMMARY OF THE INVENTION

A preferred embodiment of the present invention comprises a light source and a first light sensor which has a first light sensitive area. In addition, the present invention comprises a movable object that is disposed between the light source and the light sensor. The movable object has an aperture formed therethrough to permit a limited amount of light to pass from the light source to the first light sensor through the aperture of the movable object. The movable object is movable relative to the light source and to the first light sensor along a first axis. The first light sensitive area has a first height parallel to a first axis along which said movable object can travel and a first width that is perpendicular to the first height. The magnitude of the first width at each of a plurality of predetermined positions along the first height is a function of the distance of each of the plurality of predetermined positions from a second axis. The plane of the second axis is perpendicular to the plane of the first axis.

In a particularly preferred embodiment of the present invention, a second light sensor is also provided. The second light sensor has a second light sensitive area that is generally shaped in a manner similar to the shape of the first light sensitive area. The first and second light sensors can be arranged in abutting association with each other. The first and second heights of the first and second light sensors extend away from the second axis in directions parallel to the first axis. In one embodiment of the present invention, edges of the first and second light sensors having minimum widths of the first and second light sensors, respectively, are in abutting association with each other. The magnitude of the first width at each of a plurality of predetermined positions along the first height is selected as a function of the light intensity passing through the aperture at each of a plurality of positions of the movable object parallel to the first axis.

The shapes of the first and second light sensitive areas can be selected as a function of the light intensity emitted by the light source at various angles which are determined by the position of the aperture. The light source can emit light as an isotropic pattern, a Lambertian pattern or a pattern which is a combination of both. Alternatively, the side edges of the light sensitive areas can be formed as a straight line that taper and are spaced apart by a varying width. The minimum width of each of the two light sensitive areas can be disposed proximate the second axis and the widths of both light sensitive areas can increase as a function of their distances from the second axis. The side edges of the light sensitive areas can therefore be straight lines or curved, depending on the required accuracy of the device.

BRIEF DESCRIPTION OF THE DRAWINGS

The present invention will be more fully and completely understood from a reading of the Description of the Preferred Embodiment in conjunction with the drawings, in which:

FIGS. 9A and 9B show a simplified alternative embodiment of the present invention.

DESCRIPTION OF THE PREFERRED EMBODIMENT

Figure 1:
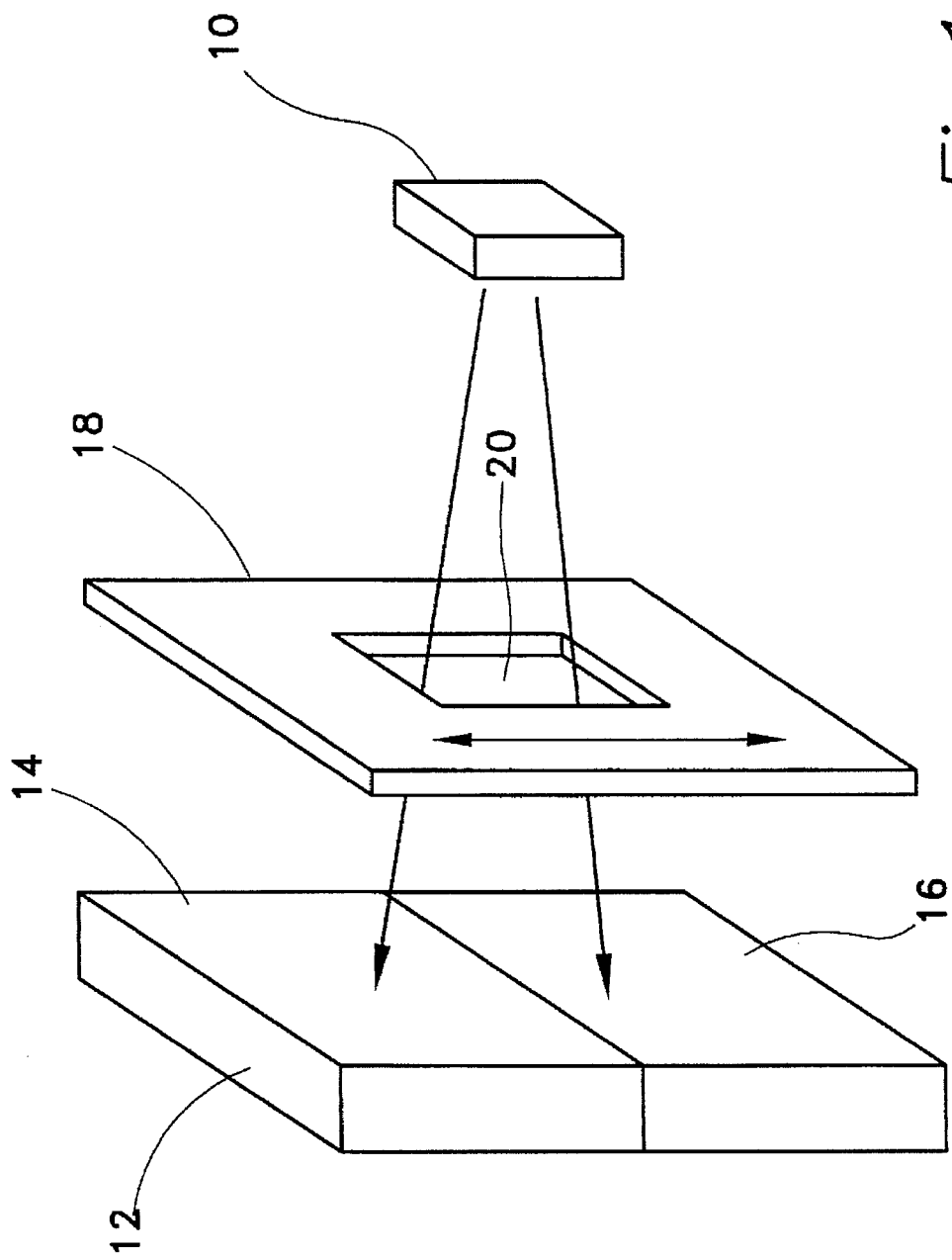
FIG. 1 shows a perspective view of the major elements of a light sensor that can be modified to incorporate the principles of the present invention.

Throughout the Description of the Preferred Embodiment, like components will be identified by like reference numerals.

FIG. 1 shows an exemplary arrangement of the components of a known light sensor. A light source 10 provides a beam of light that is represented by the two diverging arrows in FIG. 1. Although many different types of light sources can be used, a preferred embodiment of the present invention incorporates an unlensed Aluminum Gallium Arsenide (AlGaAs) light emitting diode (LED). Light emitting diodes of this type are commercially available from Honeywell Corporation and are identified as Catalog Number HLC5003. Light emitting diodes of this type emit an infrared light. A light sensor 12 is shown in FIG. 1 comprising a first light sensor 14 and a second light sensor 16. A movable object 18 is disposed between the light source 10 and the light sensor 12 and is provided with an aperture 20 formed through its thickness as shown. The construction of the photosensitive device is arranged so that light passing from the light source 10 to the light sensor 12 passes through the aperture 20. The arrow on the movable object 18 indicates that the movable object and its aperture can move up and down along a first axis relative to the stationary light source and light sensor. Throughout the description of the present invention, the output signals from the light sensors will be described as being compared by being subtracted from one another. It should be understood, however, that the comparison could also be performed in other ways, such as by taking the ratio of the two light sensor signals.

Figure 2:
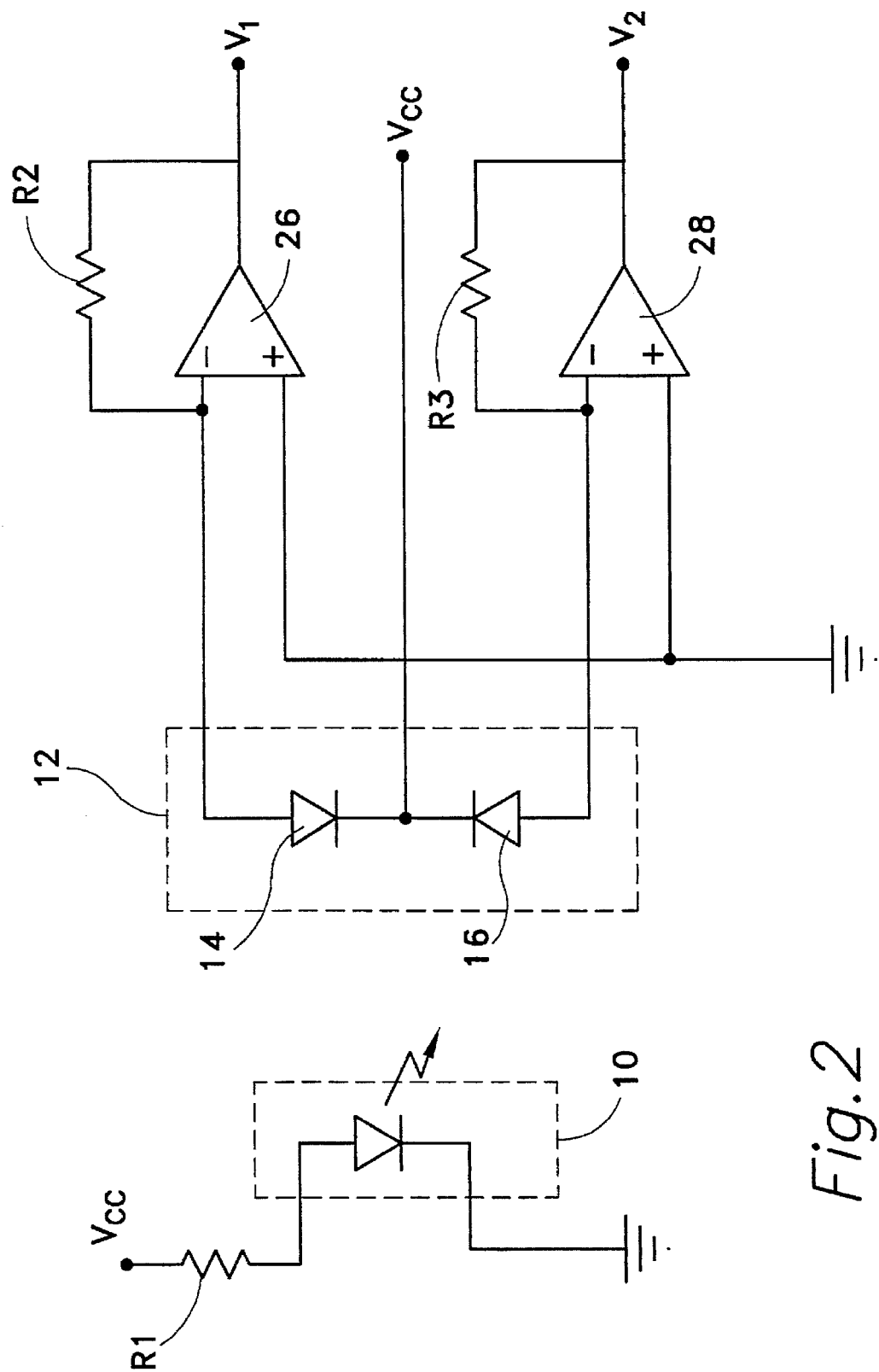
FIG. 2 shows an electrical schematic of a light sensor such as that shown in FIG. 1.

FIG. 2 shows a typical circuit arrangement that can be used in conjunction with the device shown in FIG. 1. The light source 10 is a light emitting diode that is connected between a voltage source and a circuit point of ground potential. A resistor R1 is connected in series with the light source. The light sensor 12 comprises two photodiodes, 14 and 16, that are each associated with a signal conditioning element or an amplifier. A voltage source is connected between the photodiodes as shown in FIG. 2. The first photodiode 14 is associated with an amplifier 26 and a resistor R2 to provide a first voltage output $V_1$. In a similar manner, the second photodiode 16 is associated with an amplifier 28 and a resistor R3 to provide a second voltage output $V_2$. As the light impinging on the two photodiodes changes, the first and second output signals will change. Therefore, with reference to FIGS. 1 and 2, it can be seen that a comparison of the first and second output signals, $V_1$ and $V_2$, can be used to determine the position of the movable object 18.

Figure 3:
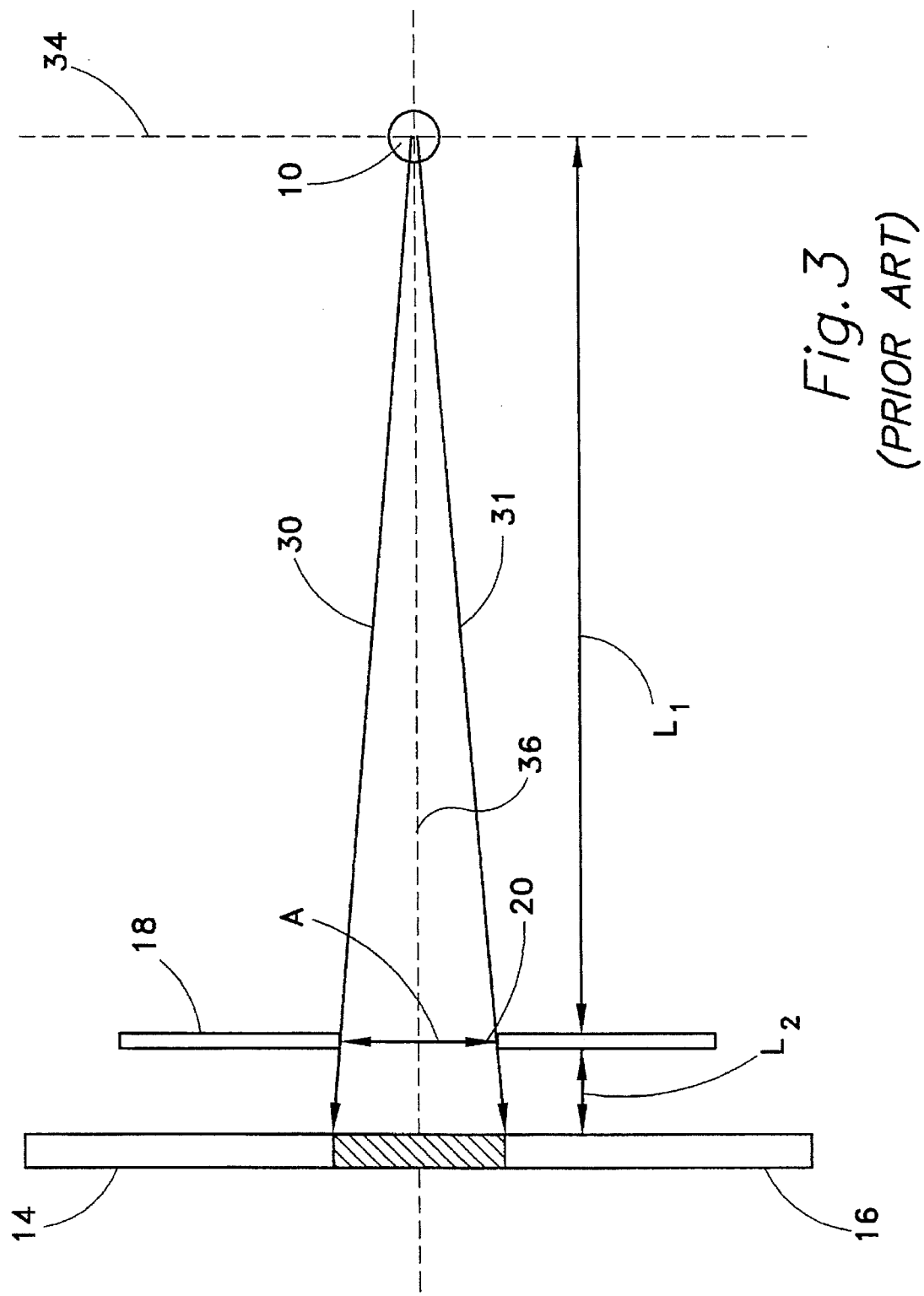
FIG. 3 is a schematic drawing showing the relative positions of the components shown in FIG. 1 along with various reference lines used to describe the operation of the device.

FIG. 3 shows a schematic representation of the three major components of the light sensor illustrated in FIG. 1. The light source 10 provides light that passes through the aperture 20 in the movable object 18. The height of the aperture is identified by reference letter A. The beam of light passing from the light source 10 through the aperture 20 is described by arrows 30 and 31. The light impinging on the photosensor is shown between the diverging arrows. The shape of the lighted area on the photosensor is determined by the shape of the aperture 20. Furthermore, it can be seen that movement of the movable object 18 will cause the lighted area to move. For purposes of the following description, it can be assumed that the thickness of the movable object 18 is negligible. The distance between the light source 10 and the movable object 18 is identified as $L_1$ and the distance between the movable object 18 and the surface of the light sensor is identified as $L_2$. It can be seen that as the movable object 18 moves up and down along the first axis described above, the lighted portions of the two light sensitive areas, 14 and 16, will change. For purposes of describing the structure shown in FIG. 3, a horizontal reference line 36 is shown and a reference line 34 extends from the light source 10 in a direction parallel to the first axis and the plane of the movable object 18.

Figure 4:
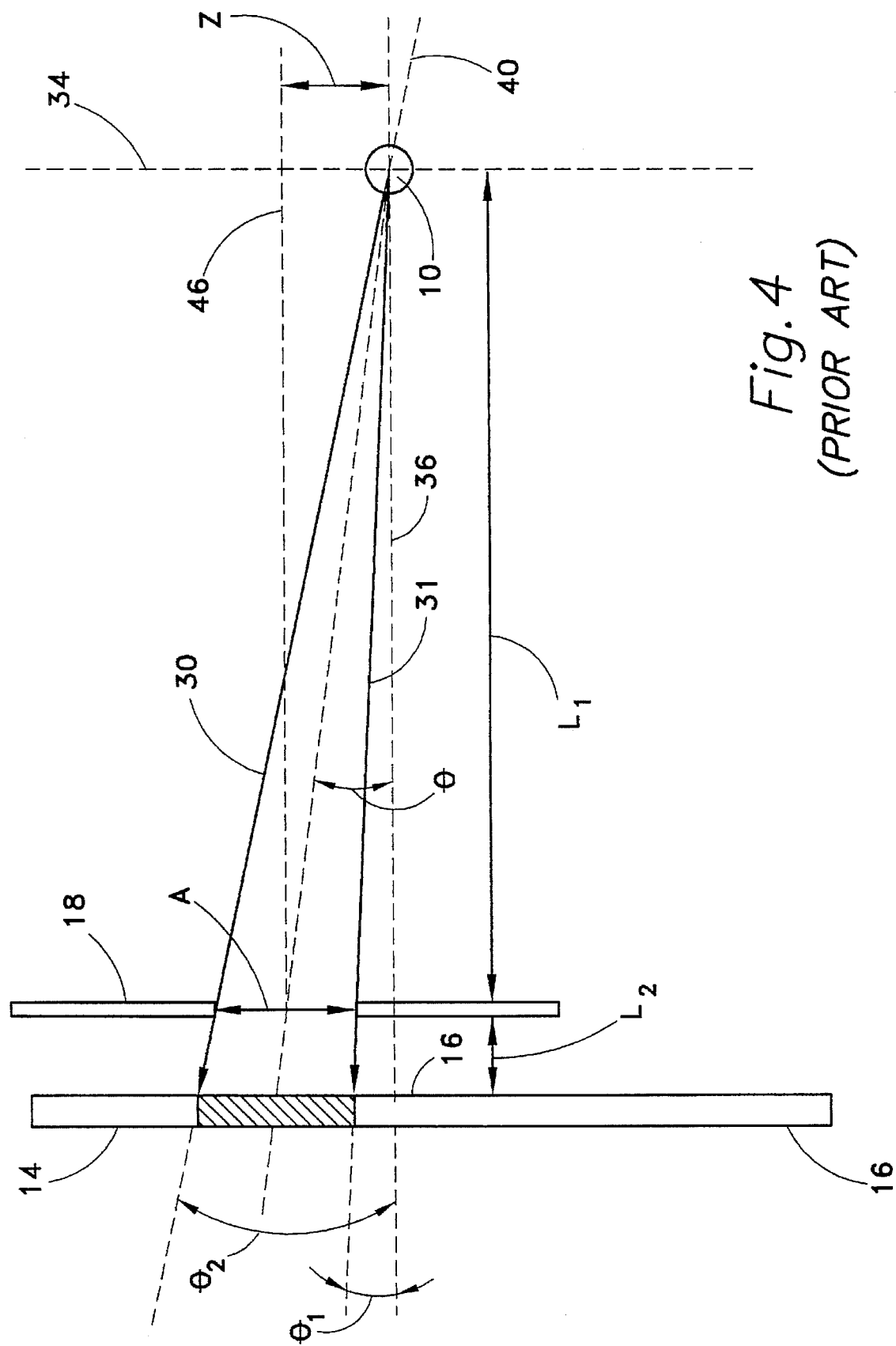
FIG. 4 shows the arrangement of FIG. 3 after the movable object has moved away from symmetrical alignment with a reference line.

FIG. 4 shows the arrangement of FIG. 3 after the movable object 18 has moved up from its position in FIG. 3. In order to describe the effect on the device caused by this movement, the movement has been exaggerated in FIG. 4. The center of the aperture has moved upward to a position that results in an angle between reference lines 36 and 40. This movement places line 31 at an angle $\Theta_1$ from line 36. In addition, the movement places line 30 at an angle of $\Theta_2$ from line 36. The enclosed angle between lines 30 and 31 can therefore be described as the difference between $\Theta_2$ and $\Theta_1$. Because of the exaggerated movement of the movable object 18 in FIG. 4, the lighted area on the sensor is completely within the first light sensitive area 14 and does not impinge on the second light sensitive area 16. It should be understood, however, that certain configurations of sensors are designed in such a way that the lighted area always impinges both light sensitive areas.

Figure 5A:
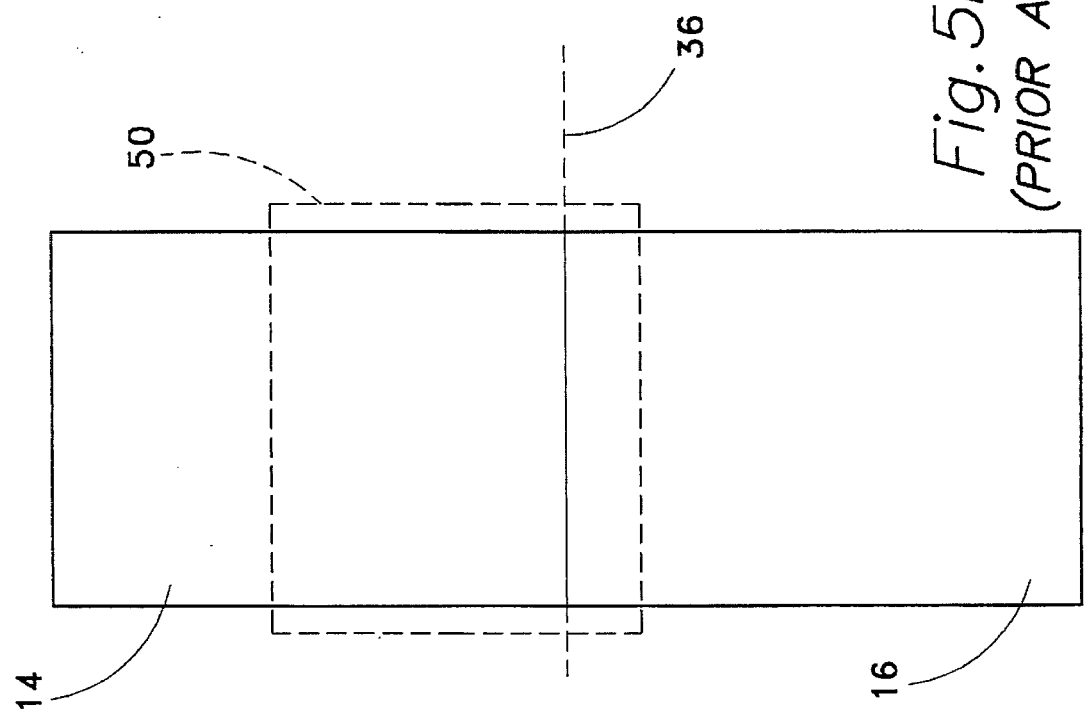
FIGS. 5A and 5B show the relative movement of a lighted portion of the light sensor in FIG. 1.
Figure 5B:
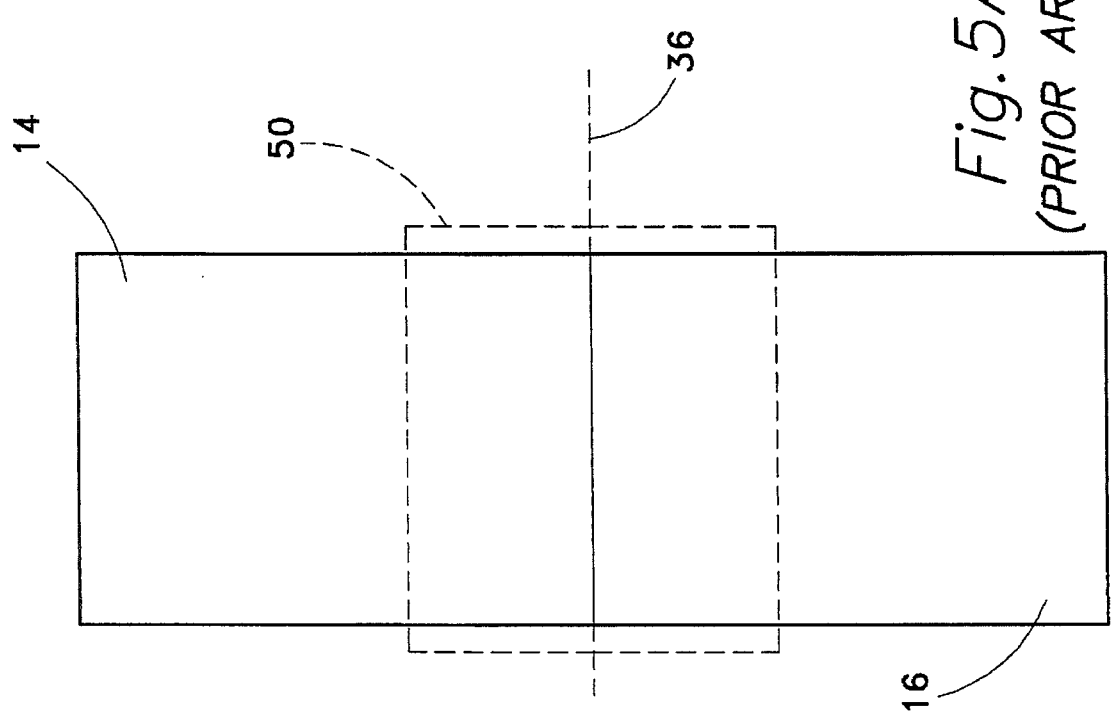

FIGS. 5A and 5B are views of the light sensor which are perpendicular to the views shown in FIGS. 3 and 4. The dashed box 50 represents the lighted area on the sensor that results from line passing from the light source 10 through the aperture 20. In FIG. 5A, the light is equally distributed between the first and second light sensitive areas, 14 and 16. If the output signals from the light sensors are compared, they will be found to be generally equal to each other. A subtraction of one output signal from the other output signal will result in a null signal that indicates that the aperture is aligned with reference line 36. However, if the lighted area 50 extends over one of the light sensitive areas more than the other, this movement of the lighted area 50 indicates that the aperture and its movable object have moved away from symmetrical alignment with reference line 36. By subtracting the output signal from the second light sensitive area 16 from the output signal from the first light sensitive area 14, the difference in the intensities of the two output signals can be used to determine the position of the movable object 18.

The total angle, $\Theta_1+\Theta_2$ shown in FIG. 4, of the light beam passing through the aperture 20 changes as a function of the position of the movable object 18. This result is caused by the geometry of the arrangement and the fact that the light source 10 emits light according to an isotropic pattern or a Lambertian pattern which does not change as a function of the movement of the movable object 18, but the circumscribed angle between lines 30 and 31 decreases as a function of the position of the movable object 18. Therefore, the intensity of light emitted by the light source 10 which passes through the aperture 20 decreases as the aperture 20 moves away from symmetrical alignment with reference line 36. This means that the total light energy impinging on lighted area 50 in FIG. 5B is less than the total light energy impinging on lighted area 50 in FIG. 5A. With reference to FIGS. 5A and 5B, a system that subtracts the light impinging on the second light sensitive area 16 from the light impinging on the first light sensitive area 14 will therefore not be perfectly linear as a function of the linear movement of the movable object 18. This nonlinearity can be significantly disadvantageous in many applications.

Figure 6:
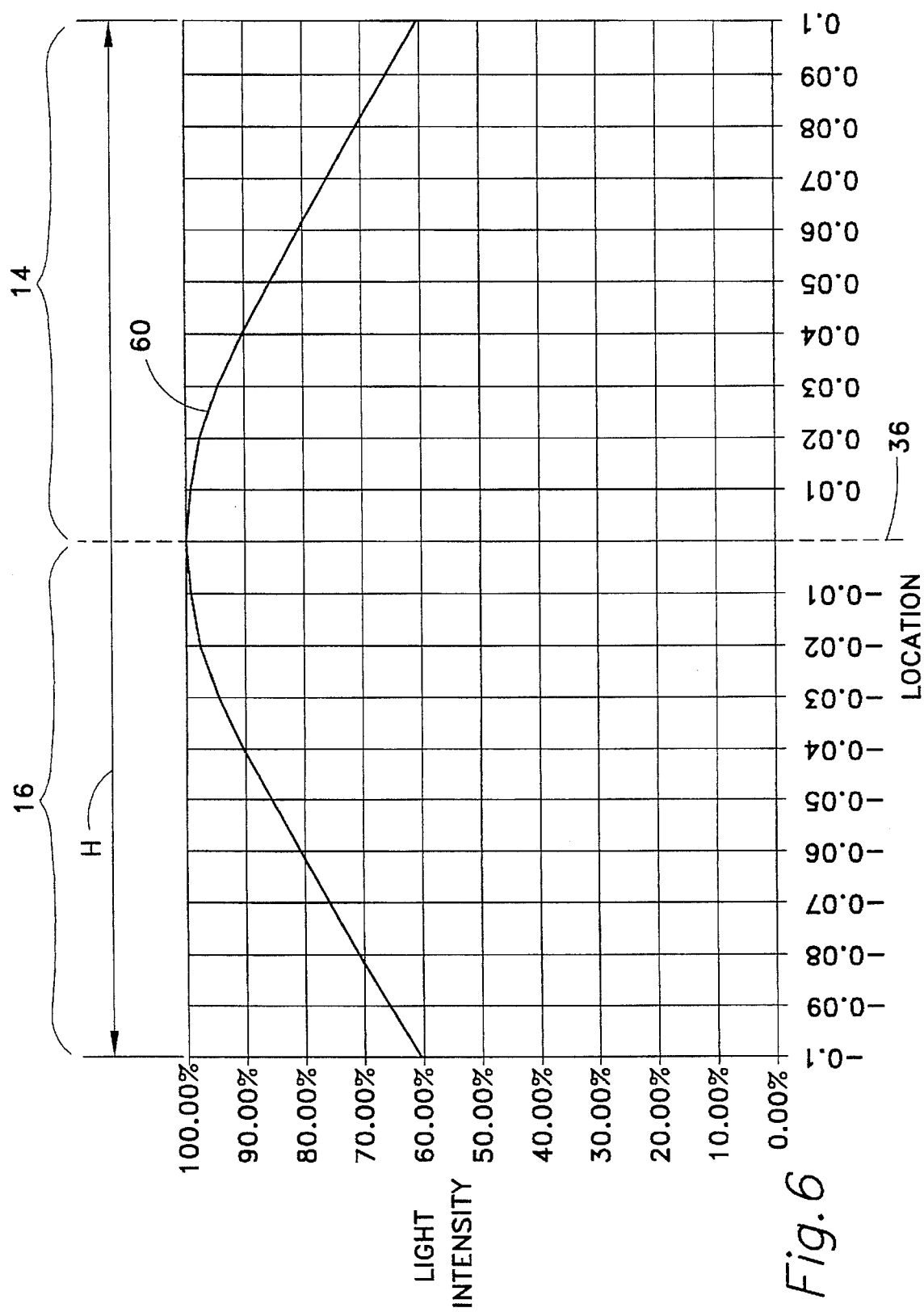
FIG. 6 is a graphical representation of the light intensity as a function of position on the light sensitive areas.

FIG. 6 is a graphical representation showing the light intensity impinging on the light sensor 12 shown in FIG. 1.

The first and second light sensitive areas, 14 and 16, are identified in FIG. 6 and line 36 represents the intersection of the plane of the light sensor 12 and a perpendicular plane in which line 36 in FIGS. 3, 4, 5A and 5B is disposed. Line 36 in FIG. 6 also represents the interface between the first and second light sensitive areas, 14 and 16. Line 60 in FIG. 6 represents the light intensity, as a percentage of the maximum intensity at line 36, for the light that is distributed on the surfaces of the first and second light sensitive areas, 14 and 16, in FIG. 5A. As can be seen in FIG. 6, the light distribution is not uniform across the light sensitive areas but, instead, changes as a function of the distance from line 36. In other words, light is imposed on the light sensitive areas at a higher intensity near line 36 than at the portions of the light sensitive areas that are farther from the interface of the first and second light sensitive areas at line 36. Because of this nonuniformity of light intensity, movement of the lighted area 50 from the position shown in FIG. 5A to the position shown in FIG. 5B will produce a nonlinear change in the relative signals generated by the light sensor. It should be understood that the shape of line 60 in FIG. 6 is intended to represent a typical distribution of light intensity and is not intended to illustrate the precise distribution of light intensity in all cases. As described above, the light emitted by the light source 10 can be isotropic, Lambertian or a combination of both. Therefore, the shape of line 60 can change from one application to another. However, it can be expected that most applications of light sensitive areas will experience a distribution of light intensities generally similar to that represented by line 60 in FIG. 6.

Figure 7:
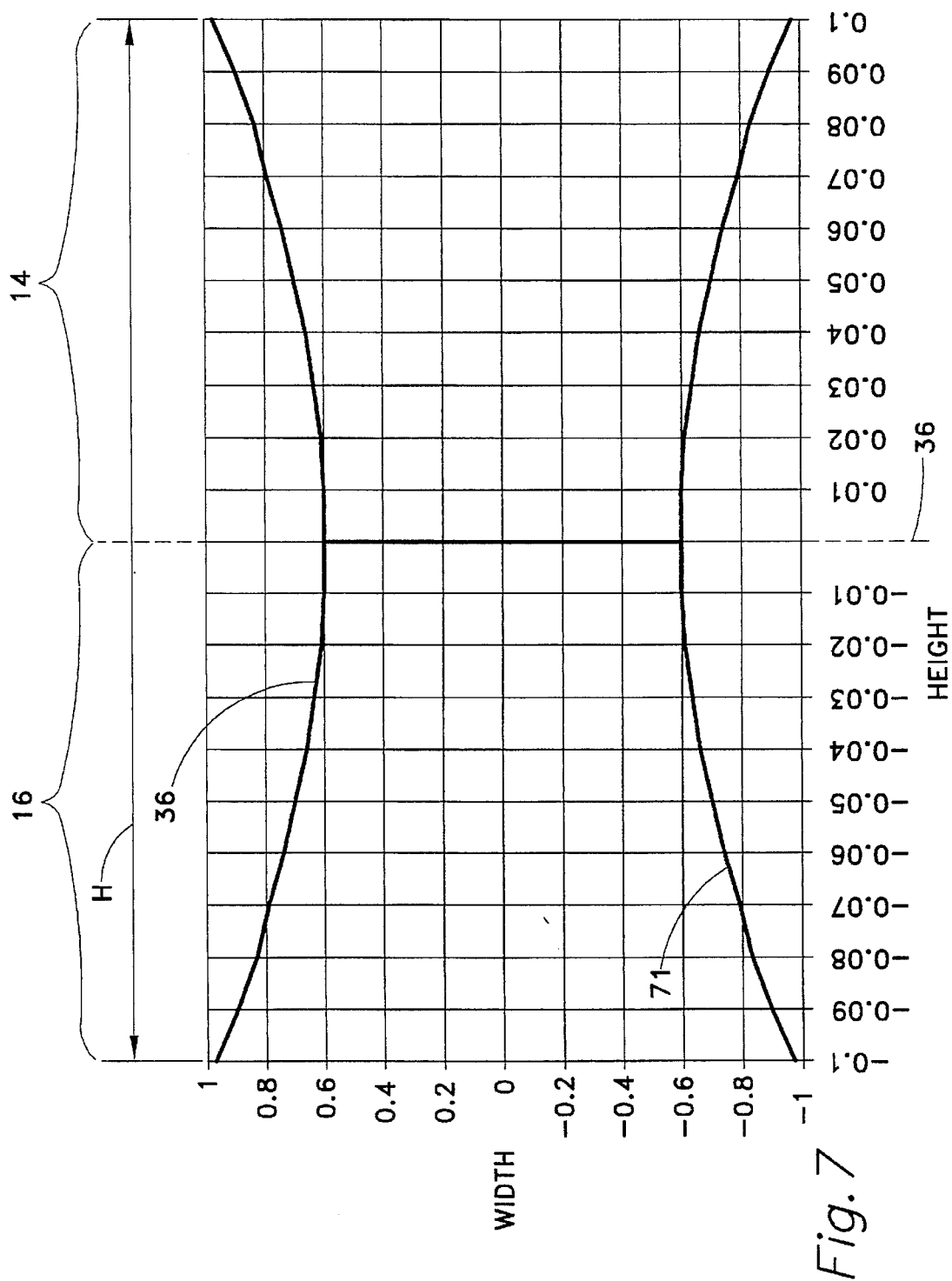
FIG. 7 is a graphical representation showing the intended width of the light sensitive areas as a function of the distance from the center of the height.

Using the basic shape of line 60 in FIG. 6, FIG. 7 shows two curved lines, 70 and 71, arranged in a diverging association with each other as they extend away from line 36. Lines 70 and 71 represent hypothetical edges of a plane that is shaped to have a width inversely proportional to the intensity shown by line 60 in FIG. 6, but with a decreased slope to account for the fact that two such lines, 70 and 71, are used at the two edges of the confined shape between the lines. In FIG. 7, dimension H and the reference numerals of the first and second light sensitive areas, 14 and 16, are provided to show the relative positions of the two lines. If a light sensor is provided with two light sensitive areas that are generally shaped to conform to the area between lines 70 and 71 in FIG. 1, the width of the confined area will be inversely proportional to the light intensity represented in FIG. 6 for generally similar distances from line 36. This generally inverse proportional relationship permits the present invention to compensate for the decrease in light intensity at farther distances from line 36 represented in FIG. 6 by providing increased widths at increasing distances from line 36 as represented in FIG. 7.

With regard to FIGS. 6 and 7, it should be understood that the precise shape of line 60 in FIG. 6 can vary from one application to another. The shape of line 60 is a function of the type of light distribution emitted by the light source 10 in FIG. 1 and the geometric relationships between the various components of the device. The distribution of light intensity shown in FIG. 6 can be isotropic, Lambertian or some combination of both. The specific type of distribution of light intensity is not limiting to the scope of the present invention. The present invention relates to shaping the surfaces of the light sensitive areas, 14 and 16, to compensate for the light intensity distribution regardless of the specific configuration of line 60 in FIG. 6. In addition, although precise mathematical relationships can be developed to describe the shape of line 60 with significant accuracy, most applications of light sensors do not require the level of mathematical precision that is within the ability of those skilled in the art. Instead, some degree of precision in the shape of the edges, 70 and 71, of the light sensitive areas can be sacrificed for the purpose of improving the manufacturing efficiency achieved during the production of the light sensor.

Figure 8:
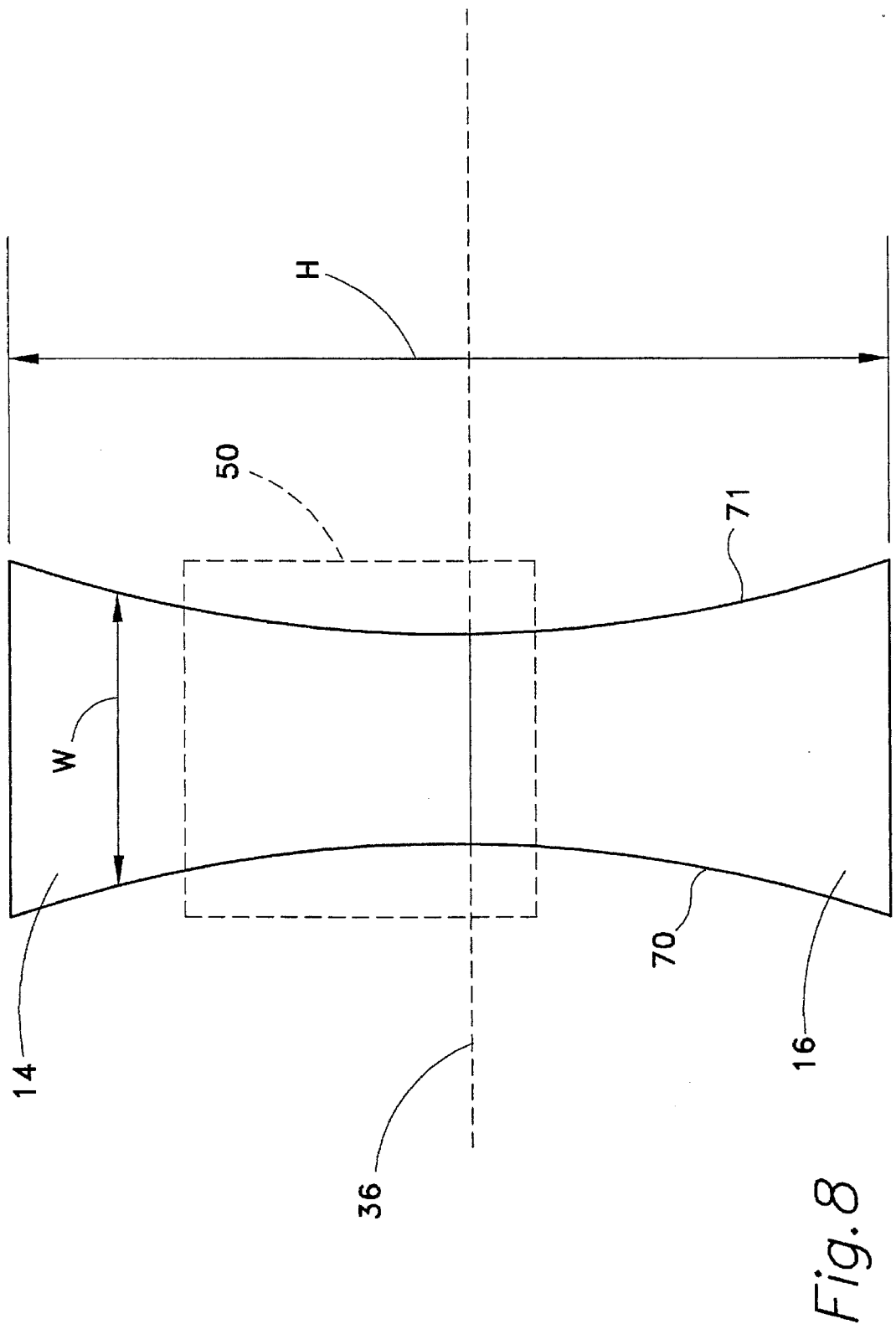
FIG. 8 shows an embodiment of the present invention made in accordance with the concepts described in conjunction with FIG. 7.

FIG. 8 shows a light sensor made in accordance with the present invention and shaped as a function of the curves shown in FIG. 7. As illustrated in FIG. 8, as the lighted area 50 moves away from symmetrical alignment with reference line 36, the light impinges on wider areas of the first light sensitive area 14. This varying width W causes the light to impinge on a greater area as it moves upward away from reference line 36. Dimension W changes as a function of the position along the height H because of the reasons described above. Although the shape of the light sensitive areas in FIG. 8 are specifically contoured to match the lines shown in the graphical representation of FIG. 7, it should be understood that the precisions of this contouring process need not be maximized in all applications of the present invention. Depending on the required linearity of the signal, a version of the present invention with light sensitive areas having edges that are generally straight can be used.

FIGS. 9A and 9B show this type of simplification of the present invention. In FIGS. 8, 9A and 9B, line 36 represents the plane of line 36 in FIGS. 3, 4, 5A, 5B and 6. The first and second light sensitive areas, 14 and 16, are shaped to have edges that are defined by generally straight lines. However, for both light sensitive areas, the widths of the light sensitive areas that are closest to reference line 36 are the minimum widths of the two light sensitive areas. Both light sensitive areas have edges that taper outward as a function of their distance away from reference line 36. Although the straight edged embodiments shown in FIGS. 9A and 9B are not expected to provide perfect linearity of the output signals from the two light sensitive components, they serve as acceptable variations of the present invention in many applications and significantly simplify the manufacture of the light sensitive components. In many situations, the reduced costs that can be achieved by this simplification resulting from straight sided light sensitive areas far offset the slight degradation in the linearity of the signals. In FIG. 9A, the lighted area 50 is shown in symmetrical alignment with the reference line 36. Movement of the movable object 18 causes the lighted area 50 to move upward in FIG. 9B. A far greater portion of the first light sensitive area 14 is lighted than the lighted portion of the second light sensitive area 16. The output signal from the second light sensor 16 can be subtracted from the output signal from the first light sensor 14 and the difference can be used to provide a generally linear indication of the position of the movable object.

Although the present invention has been described with particular detail and illustrated with significant specificity, it should be understood that alternative embodiments are within its scope.

The embodiments of the invention in which an exclusive property or right is claimed are defined as follows:

1. A photoelectric sensor, comprising:

a light source;

a first light sensor having a first light sensitive area; and a movable object disposed between said light source and said first light sensor, said movable object having an aperture formed therethrough to permit a limited amount of light to pass from said light source to said first light sensor through said movable object, said movable object being movable relative to said light source and said first light sensor along a first axis, said first light sensitive area having a first height parallel to said first axis and a first width perpendicular to said first height, the magnitude of said first width at each of a plurality of predetermined positions along said first height being a function of the distance of said each of said plurality of predetermined positions from a second axis, the plane of said second axis being perpendicular to the plane of said first axis.

2. The photoelectric sensor of claim 1, further comprising:

a second light sensor having a second light sensitive area, said second light sensitive area having a second height parallel to said first axis and a second width perpendicular to said second height, the magnitude of said second width at each of a plurality of predetermined positions along said second height being a function of the distance of said each of said plurality of predetermined positions along said second height from a second axis, the plane of said second axis being perpendicular to the plane of said first axis.

3. The photoelectric sensor of claim 2, wherein:

said first and second light sensors are arranged in abutting association with each other, the first and second heights of said first and second light sensors extending away from said second axis parallel to said first axis.

4. The photoelectric sensor of claim 2, wherein:

edges of said first and second light sensors having minimum widths of said first and second light sensors, respectively, are in abutting association with each other.

5. The photoelectric sensor of claim 1, wherein:

said magnitude of said first width at each of a plurality of predetermined positions along said first height is selected a function of the light intensity passing through said aperture at each of a plurality of positions of said movable object parallel to said first axis.

6. The photoelectric sensor of claim 2, wherein:

said magnitude of said first width at each of a plurality of predetermined positions along said first height is selected a function of the light intensity passing through said aperture at each of a plurality of positions of said movable object parallel to said first axis, said magnitude of said second width at each of a plurality of predetermined positions along said second height is selected a function of the light intensity passing through said aperture at each of a plurality of positions of said movable object parallel to said first axis.

7. The photoelectric sensor of claim 1, wherein:

said light source emits light in an isotropic pattern.

8. The photoelectric sensor of claim 1, wherein:

said light source emits light in a Lambertian pattern.

9. The photoelectric sensor of claim 1, wherein:

said light source is an LED.

10. The photoelectric sensor of claim 2, wherein:

said first and second light sensors are photodiodes.

11. A photoelectric sensor, comprising:

a light source;

a first light sensor having a first light sensitive area;

a movable object disposed between said light source and said first light sensor, said movable object having an aperture formed therethrough to permit a limited amount of light to pass from said light source to said first light sensor through said movable object, said movable object being movable relative to said light source and said first light sensor along a first axis, said first light sensitive area having a first height parallel to said first axis and a first width perpendicular to said first height, the magnitude of said first width at each of a plurality of predetermined positions along said first height being a function of the distance of said each of said plurality of predetermined positions from a second axis, the plane of said second axis being perpendicular to the plane of said first axis; and a second light sensor having a second light sensitive area, said second light sensitive area having a second height parallel to said first axis and a second width perpendicular to said second height, the magnitude of said second width at each of a plurality of predetermined positions along said second height being a function of the distance of said each of said plurality of predetermined positions along said second height from a second axis, the plane of said second axis being perpendicular to the plane of said first axis.

12. The photoelectric sensor of claim 11, wherein:

said first and second light sensors are arranged in abutting association with each other, the first and second heights of said first and second light sensors extending away from said second axis parallel to said first axis.

13. The photoelectric sensor of claim 12, wherein:

edges of said first and second light sensors having minimum widths of said first and second light sensors, respectively, are in abutting association with each other.

14. The photoelectric sensor of claim 11, wherein:

said magnitude of said first width at each of a plurality of predetermined positions along said first height is selected a function of the light intensity passing through said aperture at each of a plurality of positions of said movable object parallel to said first axis, said magnitude of said second width at each of a plurality of predetermined positions along said second height is selected a function of the light intensity passing through said aperture at each of a plurality of positions of said movable object parallel to said first axis.

15. The photoelectric sensor of claim 11, wherein:

said light source emits light in an isotropic pattern.

16. The photoelectric sensor of claim 11, wherein:

said light source emits light in a Lambertian pattern.

17. The photoelectric sensor of claim 11, wherein:

said light source is an LED, said first and second light sensors are photodiodes.

18. A photoelectric sensor, comprising:

a light source;

a first light sensor having a first light sensitive area;

a movable object disposed between said light source and said first light sensor, said movable object having an aperture formed therethrough to permit a limited amount of light to pass from said light source to said first light sensor through said movable object, said movable object being movable relative to said light source and said first light sensor along a first axis, said first light sensitive area having a first height parallel to said first axis and a first width perpendicular to said first height, the magnitude of said first width at each of a plurality of predetermined positions along said first height being a function of the distance of said each of said plurality of predetermined positions from a second axis, the plane of said second axis being perpendicular to the plane of said first axis; and a second light sensor having a second light sensitive area, said second light sensitive area having a second height parallel to said first axis and a second width perpendicular to said second height, the magnitude of said second width at each of a plurality of predetermined positions along said second height being a function of the distance of said each of said plurality of predetermined positions along said second height from a second axis, the plane of said second axis being perpendicular to the plane of said first axis, said first and second light sensors being arranged in abutting association with each other, the first and second heights of said first and second light sensors extending away from said second axis parallel to said first axis, edges of said first and second light sensors having minimum widths of said first and second light sensors, respectively, are in abutting association with each other.

19. The photoelectric sensor of claim 18, wherein:

said magnitude of said first width at each of a plurality of predetermined positions along said first height is selected a function of the light intensity passing through said aperture at each of a plurality of positions of said movable object parallel to said first axis, said magnitude of said second width at each of a plurality of predetermined positions along said second height is selected a function of the light intensity passing through said aperture at each of a plurality of positions of said movable object parallel to said first axis.

20. The photoelectric sensor of claim 18, wherein:

said light source is an LED, said first and second light sensors are photodiodes.

* * * * *